Figure 2:
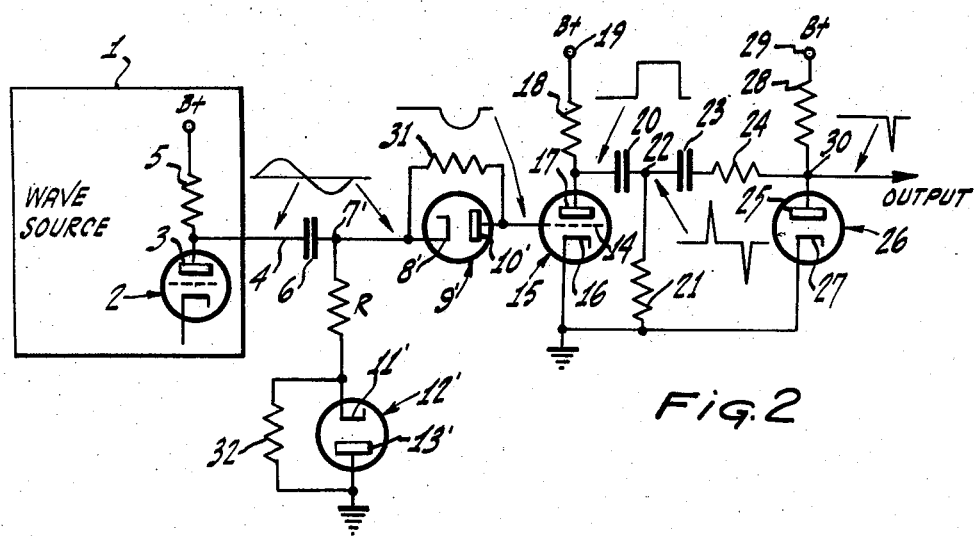

July 28, 1959 G. W. GRAY 2,897,356
PHASE STABILIZED PULSE GENERATOR
Filed Aug. 21, 1953

INVENTOR.
GEORGE W. GRAY
BY Charles H. Brown
ATTORNEY

United States Patent Office 2,897,356
Patented July 28, 1959

2,897,356
PHASE STABILIZED PULSE GENERATOR

George W. Gray, Lambertville, N.J., assignor to Radio Corporation of America, a corporation of Delaware Application August 21, 1953, Serial No. 375,587

7 Claims. (Cl. 250—27)

This invention relates to a phase stabilized pulse generator, and more particularly to a pulse forming circuit for generating an output wave accurately related in phase to an input wave, despite changes in the amplitude of the input wave. In a specific aspect, the invention relates to means responsive to an input sine wave for generating a steep-sided output wave having a phase which is unaffected by changes in the amplitude of the input sine wave.

It is often desirable to generate a square wave or a pulse wave from a sine wave. Electronic systems often include a master oscillator which generates a sine wave output used to control the frequency of operation of one or more circuits in the system. A number of circuits are known which are capable of translating a sine wave into a square wave or a pulse wave. While such known circuits provide an output wave having a frequency equal to the frequency of the input sine wave, the output wave may vary in phase relative to the input sine wave in accordance with the amplitude of the input sine wave. This phase change with sine wave amplitude comes about by reason of the build up of charge on the coupling capacitor coupling the plate of the vacuum tube in the sine wave source to the grid of the vacuum tube in the pulse generating circuit. The amount of charge on the capacitor varies with the amplitude of the sine wave. A resistor of low value may be connected from the grid side of the coupling capacitor to ground to prevent the build up of charge on the capacitor, but this has the effect of greatly reducing the gain of the system.

In many applications, it is important that the phase of an output pulse from a pulse generator remain fixed relative to the phase of an input sine wave which varies in amplitude. One such application is in the field of aircraft navigation using the omnirange system. In the omnirange system, a radio transmitter on the ground sends out a radio frequency signal which is modulated by two sine wave signals in such a manner that an omnirange receiving equipment in an aircraft can compare the phases of the two modulation signals and provide an indication of the position of the aircraft. The phase comparing and indicating means includes a pulse generator operative in response to one of the sine wave modulation signals. Since the amplitude of the sine wave modulation signal varies with the radio reception conditions, and since the accuracy with which the position of the aircraft can be determined depends upon the phase accuracy of the pulse output of the pulse generator, it is important that the phase of the output pulse remain fixed relative to the input sine wave even though the sine wave varies in amplitude. It is therefore a general object of this invention to provide an improved pulse generator which is stabilized against phase changes due to variations in the amplitude of an input wave.

It is another object of this invention to provide an improved coupling system from the output electrode of one tube to the input electrode of a following tube.

It is a further object to generate an output pulse wave fixed in frequency and phase relative to an input sine wave which may vary in amplitude.

In one aspect, the invention comprises a source of a sine wave coupled thru a coupling capacitor and thru a diode to the grid electrode of a pulse generating vacuum tube. The diode is poled to readily pass the negative half cycle of the sine wave to the grid of the vacuum tube. A direct current path is provided from the junction between the coupling capacitor and the cathode of the diode thru a resistor and thru the cathode-anode path of a second diode to the cathode of the pulse generator vacuum tube. The second diode is poled to provide a low impedance for the negative half cycle of the sine wave in the path to the cathode of the vacuum tube. The resistor has a value such that the impedance from the junction point between the coupling capacitor and the cathode of the first diode to the cathode of the vacuum tube is the same during the positive half cycle of the sine wave as it is during the negative half cycle of the sine wave. By this construction, the number of electrons applied in one direction to the coupling capacitor during the positive half cycle of the sine wave is equal to the number of electrons applied to the capacitor in the opposite direction during the negative half cycle of the sine wave. Therefore, a charge cannot build up on the coupling capacitor and cause a variation in the phase of the output pulse wave when variations occur in the amplitude of the sine wave.

Figure 1:
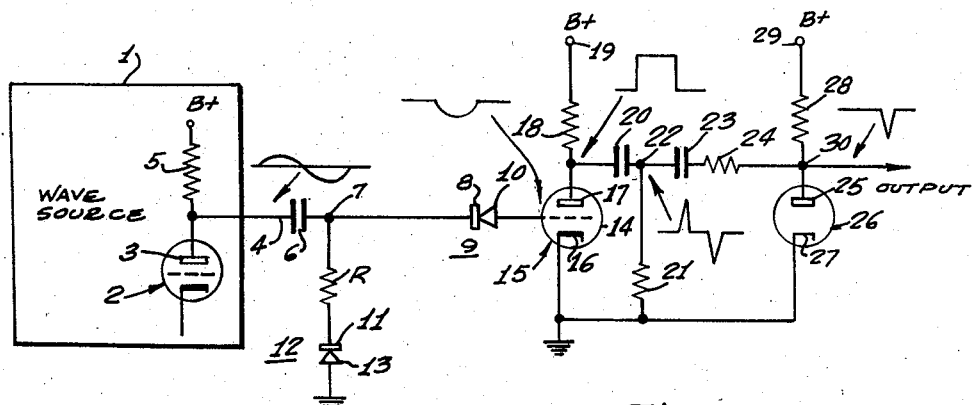

These and other objects and aspects of the invention will be apparent to those skilled in the art from the following more detailed description, taken in conjunction with the appended drawings wherein:

Figure 1 is a circuit diagram of a pulse amplifier constructed according to the teachings of this invention wherein the coupling system includes germanium or semiconductor diodes; and Figure 2 is a circuit diagram of such an amplifier wherein the coupling network includes thermionic diodes.

Reference will first be made to Fig. 1. A wave source 1, which may be a sine wave oscillator or an amplifier, includes an output vacuum tube 2 having a plate electrode 3 which supplies a sine wave output to lead 4. The plate 3 of tube 2 is connected thru an output impedance 5 to the positive terminal B+ of a source of unidirectional potential. Output lead 4 is connected thru a coupling capacitor 6 to a junction point 7 and to the cathode 8 of a diode 9, also including an anode 10. Diode 9 may be a germanium diode or semiconductor diode. Diode 9 is illustrated by a symbol which indicates the direction in which the conventional current can most easily flow. A resistor R is connected from the junction point 7 to the cathode 11 of a second diode 12. Diode 12 includes an anode 13 connected to ground. Diode 12 may similarly be a germanium or semiconductor diode.

Anode 10 of diode 9 is connected to the grid 14 of a square wave generator vacuum tube 15. Tube 15 includes a cathode 16 connected to ground and a plate 17 connected thru a plate impedance 18 to the positive terminal 19 of a source of unidirectional potential (not shown). The negative terminal of this source is connected to ground.

The square wave output on the plate 17 of tube 15 is applied to a differentiator circuit including a capacitor 20 and a resistor 21. The differentiator translates the positive going and the negative going transitions of the square wave to positive and negative steep-sided impulses (spikes) at the junction point 22 between the capacitor 20 and the resistor 21. This impulse wave is coupled thru a coupling capacitor 23 and a resistor 24 to the anode 25 of a third diode 26. The cathode 27 of diode 26 is connected to ground. Diode 26 may be a semiconductor diode such as a germanium diode or a vacuum tube diode. The anode 25 of diode 26 is also connected thru a resistor 28 to the positive terminal 29 of a source of unidirectional potential (not shown). The negative terminal of this source is connected to ground. Diode 26 is poled so that it short circuits to ground the positive impulses from the differentiator and allows the negative impulses to appear at the output terminal which is so denoted in Fig. 1.

The waveforms illustrated on the drawing are exemplary of those which appear at the points designated.

In the operation of the circuit, the sine wave output from source 1 is applied thru coupling capacitor 6 to the junction point 7. During the positive half cycle portion of the sine wave at point 7, the high back resistance of diode 9 substantially blocks the application of the positive potential to the grid 14 of vacuum tube 15. The grid 14 is thus maintained near zero potential, and since the cathode 16 is at zero potential by reason of the connection to ground, tube 15 conducts and the voltage drop across plate resistor 18 results in a relatively low potential on the plate 17 of tube 15. During the positive half cycle of the sine wave at point 7, very little current is allowed to flow in the circuit including resistor R and diode 12 by reason of the high back resistance of the diode 12.

During the following negative half cycle portion of the sine wave at junction point 7, the full negative voltage is applied thru diode 9 to the grid of tube 15, causing tube 15 to be cut off. Then, no more current flows thru plate resistor 18 and the potential at the plate 17 of tube 15 rises to the value of the B+ potential applied to terminal 19. During the negative half cycle of the sine wave at point 7, current is also allowed to flow in the circuit including resistor R and diode 12, but the amount of current is limited to a very low value by resistor R.

The value of the resistor R is chosen so that the impedance presented at point 7 to the positive half cycle of the sine wave is the same as the impedance presented to the negative half cycle of the sine wave. During the negative half cycle of the sine wave, the impedance from point 7 to ground is equal to the resistance of resistor R, for all practical purposes. This is because the impedance of diode 12 in the forward direction is relatively very low, and no current is allowed to flow in the path including diode 9 and the grid-cathode electrodes of tube 15 because tube 15 is completely cut-off by the negative half cycle applied thru diode 9 to the grid 14 of tube 15. During the positive half cycle of the sine wave, the impedance from point 7 to ground is the resistance of resistor R plus the back resistance of diode 12, in parallel with the back resistance of diode 9 plus the negligible impedance in the grid-cathode circuit of vacuum tube 15 when tube 15 is conducting. The value for resistor R can be determined by equating the impedance R from point 7 to ground during the negative half cycle of the sine wave to the impedance in the two parallel paths from point 7 to ground during the positive half cycle of the sine wave. Assuming that diodes 9 and 12 have the same back resistance, $R_b$, the equation is as follows:

$$R=\frac{R_b(R+R_b)}{R_b+(R+R_b)}$$

When this equation is solved for the value of R in terms of $R_b$, the back resistance of the diodes, it is found that resistor R should have a value equal to 0.62 times $R_b$. When resistor R is given this value, the same number of electrons flows into coupling capacitor 6 in one direction during one half cycle of the sine wave as flows out of the coupling capacitor 6 in the other direction during the other half cycle of the sine wave. Stated another way, the number of electrons flowing from point 7 thru resistor R and diode 12 to ground during one half cycle of the sine wave is equal to the number of electrons flowing over the parallel paths from ground thru diode 12 and resistor R to point 7 and from ground thru the cathode-grid path of tube 15 and thru diode 9 to the junction point 7 during the other half cycle of the sine wave. This equality exists regardless of the amplitude of the sine wave, and therefore a charge cannot build up on coupling capacitor 6 to alter the direct current level of the sine wave at point 7 and change the time at which tube 15 is cut off. The output pulse is therefore fixed in phase relative to the input sine wave.

Commercially available germanium crystal diodes have a back resistance on the order of 300,000 ohms, and a resistance in the forward direction of a few hundred ohms. Substituting the value of diode back resistance in the above formula for $R_b$, it is found that resistor R should have a value on the order of 180,000 ohms. A resistor R of this value has been found to provide the desired stability using type IN34 germanium diodes, a coupling capacitor 6 having a value of 0.25 microfarad and a 30 cycle per second sine wave input.

Reference is made to Figure 2 which is similar in structure and operation to the circuit illustrated in Figure 1, however the foregoing description in connection with Figure 1 has assumed that diodes 9 and 12 are germanium diodes having a significant back resistance $R_b$. If vacuum tube diodes are used, as shown in Figure 2, consideration must be given to the fact that vacuum tube diodes have a very high back resistance. Therefore, it may be desirable to shunt one or both of diodes 9' and 12' with a respective resistor 31 or 32 to provide one or more paths for current to flow during the positive half cycle of the sine wave. If resistors 31 and 32 are both used, they may have a value equal to the back resistance of a crystal diode, and the relation between the value of R with relation to value of the resistors 31 and 32 will be the same as given above for the value of resistor R in relation to the value of back resistance $R_b$. If only one of the resistors 31 and 32 is employed, the value of the shunting resistor and the value of resistor R are determined so as to provide the same impedance from the point 7' to ground during the negative half cycle of the sine wave as exists during the positive half cycle of the sine wave. It is noted that silicon, copper oxide, selenium and other types of diode rectifiers may be similarly utilized.

The circuits shown and described are not limited to use with an input wave which is a sine wave. The action of the circuit in any case is to maintain the junction point 7' at zero potential so far as direct current is concerned, and the sine wave present at point 7 or 7' has an area above zero potential which is equal to the area below zero potential.

It is apparent that means have been provided to apply an input wave thru a coupling capacitor to the control electrode of a wave forming tube in such a manner that the output of the wave forming tube is fixed in phase relative to the input wave despite variations which may occur in the amplitude of the input wave.

What is claimed is:

1. A wave translating circuit comprising a vacuum tube including cathode, grid, and plate electrodes; means to apply a positive potential to said plate relative to said cathode, means connecting said cathode to a point of reference potential, an input wave source, means including, in the order named, a coupling capacitor and a first diode coupling said wave source to the grid of said vacuum tube; a resistor and a second diode connected in series from the junction point between said coupling capacitor and said first diode to said point of reference potential, a differentiator circuit coupled to the plate of said vacuum tube, and means coupled to the output of said differentiator circuit to clip the output pulses of one polarity from said differentiator circuit.

2. A pulse generator comprising means for generating a sine wave, means for generating a substantially square wave, means coupling said sine wave generating means to said square wave generating means, whereby said square wave generating means is operative in response to said sine wave generating means, said coupling means presenting substantially the same impedance during both positive-going and negative-going portions of the sine wave generated by said first-named means, and means coupled to said square wave generating means for differentiating the voltage wave output thereof, thereby to produce successive pulses of opposite polarity.

3. A pulse generator comprising means for generating a sine wave, means for generating a substantially square wave, means coupling said sine wave generating means to said square wave generating means, whereby said square wave generating means is operative in response to said sine wave generating means, said coupling means presenting substantially the same impedance during both positive-going and negative-going portions of the sine wave generated by said first-named means, means coupled to said square wave generating means for differentiating the voltage wave output thereof, thereby to produce successive pulses of opposite polarity, and means receptive of said pulses for suppressing all of the pulses of one polarity.

4. A wave translating circuit comprising a vacuum tube having cathode, grid, and plate electrodes; a connection from said cathode to a point of reference potential, means to bias said plate positive relative to said cathode, a sine wave source, a first diode having its anode connected to said grid through connections devoid of concentrated impedance and having its cathode connected to said source, and a resistor and a second diode connected in series in the order named from said source to said point, said resistor having a value of resistance substantially equal to 0.6 times the back resistance of said diodes.

5. A wave translating circuit comprising a vacuum tube having cathode, grid, and plate electrodes; a connection from said cathode to a point of reference potential, means to bias said plate positive relative to said cathode, a sine wave source, a first diode having its anode connected to said grid through connections devoid of concentrated impedance and having its cathode connected to said source, and a resistor and a second diode connected in series in the order named from said source to said point, said resistor having a value of resistance such that the impedance presented by the circuits connected to said source is substantially the same during both positive and negative excursions of said sine wave.

6. A wave translating circuit comprising a vacuum tube having cathode, grid, and plate electrodes; a connection from said cathode to a point of reference potential, means to bias said plate positive relative to said cathode, a sine wave source, a coupling capacitor and a first diode connected in series in the order named between said source and said grid, said diode having its anode connected to said grid through connections devoid of concentrated impedance and having its cathode connected to said capacitor, and a resistor and a second diode connected in series in the order named from the junction of said capacitor and said first diode to said point.

7. A wave translating circuit comprising a vacuum tube having cathode, grid, and plate electrodes; a connection from said cathode to a point of reference potential, means to bias said plate positive relative to said cathode, a sine wave source, a coupling capacitor and a first diode connected in series in the order named between said source and said grid, said diode having its anode connected to said grid through connections devoid of concentrated impedance and having its cathode connected to said capacitor, and a resistor and a second diode connected in series in the order named from the junction of said capacitor and said first diode to said point, said resistor having a value of resistance such that the impedance presented by the circuits connected to said source is substantially the same during both positive and negative excursions of said sine wave.

References Cited in the file of this patent

UNITED STATES PATENTS

| | | |
|---|---|---|
| 2,251,973 | Beale et al. | Aug. 12, 1941 |
| 2,259,532 | Nicholson | Oct. 21, 1941 |
| 2,478,683 | Bliss | Aug. 9, 1949 |
| 2,553,284 | Sunstein | May 15, 1951 |
| 2,561,066 | Moody | July 17, 1951 |
| 2,616,047 | Boothroyd | Oct. 28, 1952 |
| 2,675,473 | Femmer | Apr. 13, 1954 |
| 2,735,007 | McCurdy | Feb. 14, 1956 |
| 2,789,220 | Lubkin et al. | Apr. 16, 1957 |